US006404511B1

(12) United States Patent
Lin et al.

(10) Patent No.: US 6,404,511 B1
(45) Date of Patent: Jun. 11, 2002

(54) SELF-CALIBRATION OF NETWORK COPIER SYSTEM

(75) Inventors: Tsung-Nan Lin; Joseph Shu, both of San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/209,904

(22) Filed: Dec. 11, 1998

(51) Int. Cl.[7] ................................................ H04N 1/46
(52) U.S. Cl. ..................... 358/1.9; 358/504; 358/523
(58) Field of Search .......................... 358/1.9, 504, 518, 358/523, 524, 500, 501, 400, 401, 406; 382/162, 167

(56) References Cited

U.S. PATENT DOCUMENTS

| 5,107,332 A | 4/1992 | Chan .......................... 358/518 |
| 5,309,257 A | 5/1994 | Bonino et al. ............... 358/504 |
| 5,327,256 A | 7/1994 | Kang et al. .................. 358/445 |
| 5,339,176 A | 8/1994 | Smilansky et al. .......... 358/504 |
| 5,452,112 A | 9/1995 | Wan et al. ................... 358/504 |
| 5,481,380 A | 1/1996 | Bestmann .................... 358/504 |
| 5,483,360 A | 1/1996 | Rolleston et al. ........... 358/518 |
| 5,489,998 A | 2/1996 | Yamada et al. .............. 358/523 |
| 5,491,568 A | 2/1996 | Wan ............................ 358/518 |
| 5,519,426 A | 5/1996 | Lukis et al. ................. 347/211 |
| 5,528,704 A | 6/1996 | Parker et al. ............... 382/299 |
| 5,543,940 A | 8/1996 | Sherman ..................... 358/518 |
| 5,552,904 A | 9/1996 | Ryoo et al. .................. 358/518 |
| 5,553,171 A | 9/1996 | Lin et al. .................... 382/299 |
| 5,561,459 A | 10/1996 | Stokes et al. ............... 348/180 |
| 5,579,031 A | 11/1996 | Liang .......................... 345/604 |
| 5,581,376 A | 12/1996 | Harrington .................. 358/518 |
| 5,583,666 A | 12/1996 | Ellson et al. ................ 358/518 |
| 5,594,557 A | 1/1997 | Rolleston et al. ........... 358/518 |
| 5,606,432 A | 2/1997 | Ohtsuka et al. ............. 358/527 |
| 5,610,732 A | 3/1997 | Komatsu ..................... 358/525 |
| 5,612,902 A | 3/1997 | Stokes et al. ................. 702/85 |
| 5,621,545 A | 4/1997 | Motta et al. ................. 358/518 |
| 5,625,378 A | 4/1997 | Wan et al. ................... 345/600 |
| 5,631,746 A | 5/1997 | Overall et al. .............. 358/448 |
| 5,692,071 A | 11/1997 | Govaert ...................... 382/167 |
| 5,704,026 A | 12/1997 | Wan ............................ 345/590 |
| 5,712,925 A | 1/1998 | Ohga .......................... 382/167 |
| 5,721,572 A | 2/1998 | Wan et al. ................... 345/590 |
| 5,754,184 A | 5/1998 | Ring et al. .................. 345/604 |
| 5,793,414 A | 8/1998 | Shaffer ....................... 725/133 |

OTHER PUBLICATIONS

SPIE Optical Engineering Press, "*Color Technology for Electronic Imaging Devices*", 1997, pp. 64–101, 141–152 and 248–251, H.R. Kang.

*Primary Examiner*—Thomas D. Lee
(74) *Attorney, Agent, or Firm*—Michael T. Gabrik

(57) ABSTRACT

A technique for calibrating non-reference printers to a reference printer in a network system by determining a set of four 1-D look-up tables for each non-reference printer. Each set of four 1-D look-up tables is constructed from a corresponding set of transfer functions, where each transfer function in a given set is a composite of a 1-D characteristic function for a particular primary color of the reference printer and a 1-D inverse characteristic function for that particular primary color of the corresponding non-reference printer. The characteristic functions are determined by performing a specific color space transformation analysis on each non-reference printer and on the reference printer.

25 Claims, 7 Drawing Sheets

SELF-CALIBRATION OF NETWORK COPIER SYSTEM

CROSS-REFERENCE TO RELATED APPLICATIONS

This application is related to U.S. patent application entitled "Simulation of the Output of a First Imaging Device by a Second Different, Imaging Device" identified by Ser. No. 08/996,531 and filed Dec. 23, 1997, U.S. patent application entitled "Device-Independent and Medium-Independent Color Matching Between an Input Device and an Output Device" identified by Ser. No. 09/050,860 and filed Mar. 30, 1998, and U.S. patent application entitled "Self-Calibration for Color Image Reproduction System" identified by Ser. No. 09/050,867 and filed Mar. 30, 1998, all assigned to the assignee of this application.

BACKGROUND OF THE INVENTION

1. Field of the Invention

This invention relates generally to the self-calibration of a network copier system, and more particularly to a calibration technique to enable different printers of the same type to generate high fidelity color reproductions of an original image with minimal or no variation between the reproductions produced by the different printers.

2. Description of the Related Art

A network copier system typically includes input devices, such as color scanners, for scanning an original color image and for producing scanner color signals representing the image, output devices, such as color printers, for reproducing the color image, and a digital image processor for transforming scanner color signals into printer color signals.

Each color input and output device uses a device-dependent color-coordinate system to specify colors. These coordinate systems are often specified in some color space that naturally maps the color coordinates to the color-generation mechanism of the device. The term color space refers to an N-dimensional space in which each point in the space corresponds to a particular color.

Many color spaces are possible; some of the more common are RGB, CMY(K) and CIELAB color spaces. In the RGB color space, each point in the space represents a particular color which is formed by additive amounts of red (R), green (G) and blue (B) colorants. Scanners are typically controlled by signals that are specified in RGB color space. In the CMYK color space, each point in the space represents a particular color that is formed from a subtractive combination of cyan (C), magenta (M), yellow (Y) and black (K) color dyes. If black (K) is not used, the color space is designated as CMY. Ink printers normally operate in CMY (K) color space in which the colors are superimposed in selected amounts on a reflective background surface such as white paper. The dyes selectively absorb certain ranges of wavelengths of light and the eye perceives the reflected light; thus the term "subtractive." The CIELAB color space is an internationally standardized color space which provides a relatively uniform perceptual space for describing colors. A uniform perceived change for a given input change is a very desirable property in that the precision required to express colors to a particular degree of fidelity can be more readily specified in a color space with uniform perceptual characteristics. Thus, the CIELAB color space is particularly useful in applications requiring precise color reproduction. The dimensions in this color space are defined by L*, a* and b* which are used to represent luminance (or lightness), hue angle and chrominance (or colorfulness).

Many practical devices are capable of sensing or reproducing only a portion of the full range of colors that can be discerned by a human observer. A device color gamut refers to the range of colors that can be sensed or reproduced by a particular device. For example, a scanner color gamut $G_s$ corresponds to the set of colors which can be detected by that scanner and a printer color gamut $G_p$ corresponds to the set of all colors which can be printed by that printer.

The scanner color gamut $G_s$ is determined by a variety of factors including the spectral response of the scanning sensor, spectral characteristics of the color filters used to extract color values for a given color input, spectral characteristics of the illuminant, and the resolution and linearity of analog-to-digital converters. The printer color gamut $G_p$ is also determined by a variety of factors including properties of the media and ink, resolution or dots per inch of the printed image, halftoning methods, and device drivers. Different printers typically have different color gamuts.

Although it is possible in principle to construct a color image reproduction system by merely connecting an output device directly to an input device, the results generally would not be satisfactory because the device-dependent coordinate systems and color spaces for the input and output devices are generally not the same. Even if the two sets of coordinate systems and color spaces are the same, the fidelity of the reproduced image as compared to the original image would probably be very poor because the gamut of the input device generally is not co-extensive with the gamut of the output device. Values representing "out-of-gamut" colors that are not in the output device gamut cannot be reproduced exactly. Instead, some "in-gamut" color that is in the gamut of the output device must be substituted for each out-of-gamut color.

Color image reproduction systems can achieve high-fidelity reproductions of original images by applying one or more transformations or mapping functions to convert point coordinates in one color space into appropriate point coordinates in another color space. These transformations may be conveniently performed by the digital image processor, mentioned above. In particular, with respect to the output device gamut, transformations are used to convert values representing in-gamut and out-of-gamut colors in an input-device-dependent color space (DDCS) into values representing in-gamut colors in an output-DDCS.

The transformation of output device in-gamut colors for many practical devices are non-linear and cannot be easily expressed in some analytical or closed form; therefore, practical considerations make accurate implementations difficult to achieve. Many known methods implement these transformations as an interpolation of entries in a look-up table (LUT) derived by a process that essentially inverts relationships between device responses to known input values. For example, a transformation for an input device may be derived by using a medium conveying patches of known color values in some device-independent color space (DICS) such as the CIELAB space, scanning the medium with the input device to generate a set of corresponding values in some input-DDCS such as RGB color space, and constructing an input LUT comprising table entries that associate the known color L*a*b* values with the scanned RGB values. In subsequent scans of other images, scanned RGB values can be converted into device-independent L*a*b* values by finding entries in the input LUT having RGB values that are close to the scanned values and then interpolating between the associated L*a*b* values in those table entries. Various interpolation techniques such as trilinear, prism, pyramidal and tetrahedral interpolation may be used.

Similarly, a transformation for an output device may be derived by producing a medium with color patches in response to color values selected from some output-DDCS such as CMYK color space, determining the color value of the patches in a DICS such as CIELAB space by measuring the patches using a spectral photometer, and constructing an output LUT comprising table entries that associate the measured color L*a*b* values with the corresponding CMYK values. In subsequent output operations, L*a*b* color values can be converted into device-dependent CMYK values by finding entries in the output LUT having L*a*b* values that are close to the desired values and then interpolating between associated CMYK values in those table entries. Various interpolations such as those mentioned above may be used.

In operation, a color image reproduction system scans an original image to obtained scanned value in some input-DDCS, transforms the scanned values into some DICS, transforms these device-independent values from the DICS into some output DDCS and, in response, generates a replica of the original image. As mentioned above, the transformations described thus far apply only to output device in-gamut colors.

By definition, output device out-of-gamut colors cannot be reproduced exactly. Instead, high-quality color image reproduction systems use transforms or mapping functions that substitute an in-gamut color for each out-of-gamut color. Preferably, these transforms attempt to minimize the perceptible difference between each out-of-gamut color and the corresponding substitute in-gamut color.

One of the problems that is encountered in network copier/printer systems is that, even with color transformation techniques and gamut mapping, the colors produced by two different printers in response to the same input signal may differ. This results in variations in output images generated by different printers in response to the same input signal. These variations may be quite noticeable among different printers of the same type (i.e., different ink-jet printers or different laser printers) and exist even among printers of the same model.

3. Objects of the Invention

It is, therefore, an object of the present invention to overcome the aforementioned problems.

It is another object of this invention to provide a self-calibration technique which may be applied to an open loop network copier system to minimize the variations in output images produced by different printers of the same type in response to the same input signal.

It is a further object of this invention to provide a technique for determining a plurality of one-dimensional (1-D) transfer functions which, when applied to the respective color signals of a non-reference printer, will enable it to generate an output very similar to the output generated by another reference printer of the same type as the non-reference printer.

SUMMARY OF THE INVENTION

One aspect of the invention involves a method for calibrating one or more non-reference imaging devices to a reference imaging device, where the imaging devices are preferably printers of the same type and more preferably of the same model. The method comprising the steps of: determining a set of 1-D inverse characteristic functions for each non-reference imaging device to be calibrated, where each inverse characteristic function of a given set relates a particular primary color of that non-reference imaging device with at least one color element of an input device, such as a scanner; determining a set of 1-D characteristic functions for the reference imaging device, where each characteristic function in the set relates a particular primary color of the reference imaging device with at least one color element of the input device; determining a set of 1-D transfer functions in the form of a set of 1-D look-up tables for each non-reference imaging device based on the determined set of 1-D characteristic functions for the reference imaging device and the determined set of 1-D inverse characteristic functions for that non-reference imaging device; and applying each set of 1-D look-up tables to the corresponding non-reference imaging device to calibrate that non-reference imaging device to the reference imaging device.

In the case where the primary colors of each non-reference and reference printer are C, M, Y and K and the color elements of the input device are R, G and B, the sets of 1-D inverse characteristic functions for each non-reference imaging device and the set of 1-D characteristic functions for the reference imaging device are determined by scanning a color calibration sheet of the corresponding imaging device to generate corresponding RGB data from CMYK data using color space transformation analysis.

Each set of 1-D transfer function look-up tables may be incorporated into the corresponding non-reference imaging device that forms part of a network imaging system that also includes a reference imaging device and an input device.

The invention may also be embodied in a system which includes means for performing the calibration method in the form of a program of system executable instructions or hardware.

The invention may also be embodied in a a processor-readable medium having a program of instructions embodied therein for causing a processor to perform the calibration method, or in a carrier wave encoded to transmit such a program of instructions.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
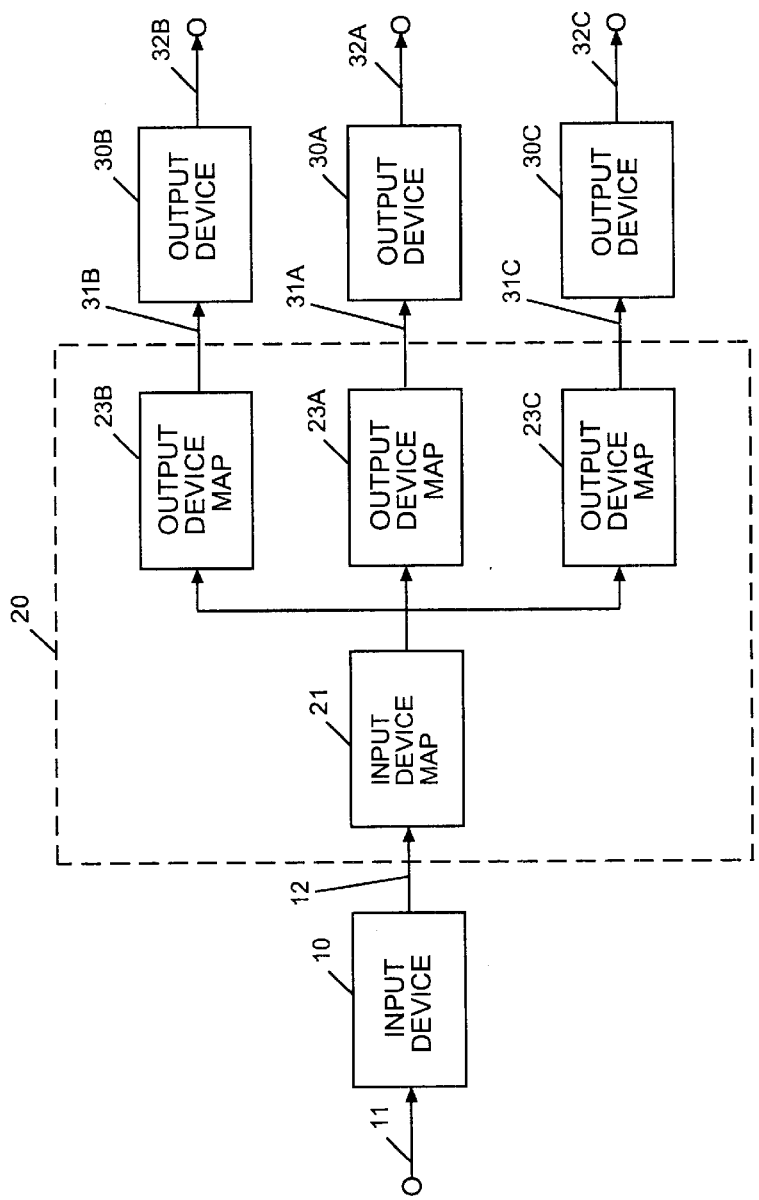
FIG. 1 is a block diagram illustrating major components in a network color image reproduction system constructed in accordance with embodiments of the present invention.

FIG. 1 illustrates major components in a network color image reproduction system constructed in accordance with the invention. Input device 10 receives from path 11 signals representing an original image and generates along path 12 an input-device-dependent representation of the original image. Controlling device 20 receives this representation from path 12 and, in response, generates along paths 31A, 31B and 31C output-device-dependent representations of the original image. Output devices 30A, 30B and 30C receive this representation from paths 31A, 31B and 31C respectively and, in response, generate along paths 32A, 32B and 32C individual replicas of the original image. The present invention is directed toward a self-calibration technique for eliminating or minimizing variations in the output images produced by the different output devices 30A, 30B and 30C in response to the same input signal 12.

Input device 10 is preferably any type of scanner or equivalent device. If input device 10 is an optical scanner, for example, the signals received from path 11 10 could be considered to be optical.

Each of output devices 30A, 30B and 30C is preferably a printer or equivalent device. If output devices 30A, 30B and 30C are ink-jet printers, for example, the replicas generated along paths 32A, 32B and 32C could be considered to be printed images. By way of example, the network color image reproduction system shown in FIG. 1 includes three output devices. However, in accordance with the principles of the invention, the system may include two or more output devices.

By its very nature, the characteristics of the input-device-dependent representation generated along path 12 depends on the characteristics of input device 10. Many optical scanners, for example, generate signals representing colors as points with red (R), green (G) and blue (B) coordinates in an RGB device-dependent color space (DDCS). For ease of discussion herein, the input-DDCS will generally be referred to as RGB space; however, other color spaces and representations may be used to practice the present invention.

Similarly, the characteristics of the output-device-dependent representations generated along paths 31A, 31B and 31C are chosen to match the characteristics of output devices 30A, 30B and 30C respectively. Many color printers, for example, generate images in response to values representing cyan (C), magenta (M), yellow (Y) and black (K) coordinates in a CMYK DDCS. For ease of discussion herein, the output-DDCS will generally be referred to as CMYK space; however, other color spaces and representations may be used to practice the present invention.

Controlling device 20 is responsible for transforming signals representing the original image in the input-DDCS into signals representing the same image in the output-DDCS for each of the output devices 30A, 30B and 30C. This may be accomplished by using input-device map 21 to transform the input-DDCS signals into a representation in a device-independent color space (DICS), and using output-device maps 23A, 23B and 23C to transform the DICS representation into the signals representing the same image in the output-DDCS for each output device 30A, 30B and 30C. Controlling device 20 may include other transformations and processes such as those described herein.

Figure 2:
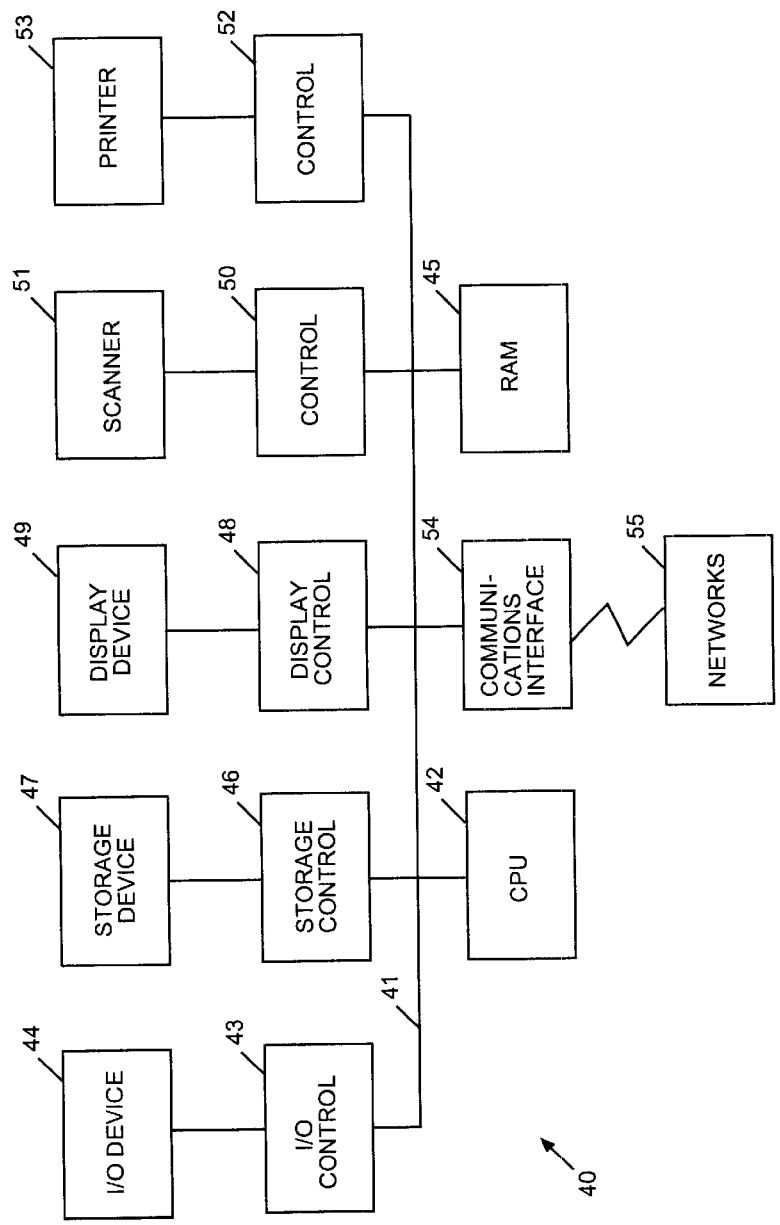
FIG. 2 is a block diagram illustrating major components in a typical personal computer system that may be used to implement various aspects of the present invention.

Controlling device 20 may be implemented by software and/or hardware in a general-purpose computer such as that illustrated in FIG. 2, which is a functional block diagram of one embodiment of a typical personal computer system 40. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Control 50 represents an interface to scanner 51 which is an input device like an optical scanner. Control 52 represents an interface to printer 53 which is an output device like an ink jet color printer. Devices like scanner 51 preferably serve as input device 10 and devices like printer 53 preferably serve as output devices 30A, 30B and 30C.

Computer system 40 may also include a communication interface 54 which enables computer system 40 to communicate with other systems through any one or more of a variety of networks 55, including local area networks (LANs), the internet and online services, via direct connection, modem, or wireless communication. In any such configuration, communication interface 54 sends and receives electrical, electromagnetic or optical signals that carry data streams representing various types of information. These signals, which carry data to and from computer system 40, are exemplary forms of carrier waves for transporting program code for executing the techniques of the present invention.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. A bus architecture is not required to practice the present invention.

The functions of one or more computer components as well as various aspects of the present invention can be implemented in a wide variety of ways including discrete logic components, one or more ASICs and/or program-controlled processors.

Figure 3A:
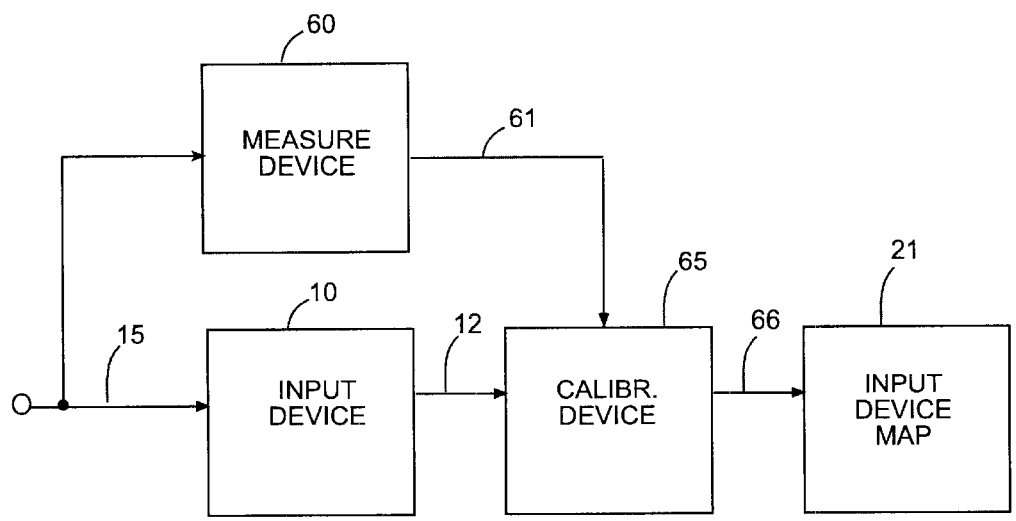
FIGS. 3A and 3B are block diagrams showing major components for deriving transformations for input and output devices.
Figure 3B:
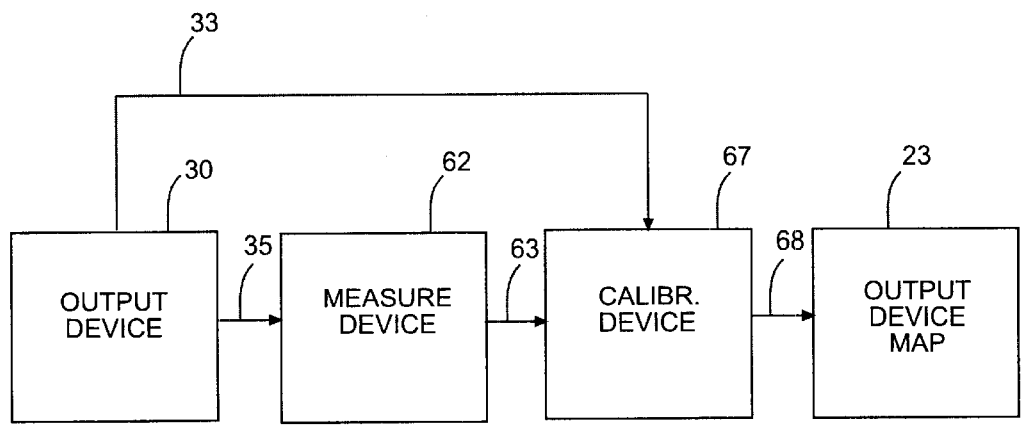

FIGS. 3A and 3B illustrate major components for deriving input-device map 21 and output-device maps 23A, 23B and 23C. These illustrations and the following discussion are presented merely as examples to illustrate principles. These maps or transformations may be derived in other ways.

Referring to FIG. 3A, input-device map 21 may be derived by scanning an image 15 that has known color characteristics. For example, image 15 may be one or more sheets of paper with areas or "patches" of known color. The color characteristics of these patches may be determined by measure device 60 such as a spectral photometer or colorimeter. According to the technique shown in the figure, measure device 60 scans image 15 and generates signals along path 61 representing the colors of the patches in some DICS such as the Commission International de L'Eclairage (CIE) 1931 XYZ space, referred to herein as CIE XYZ space. Input device 10 scans image 15 and generates signals along path 12 representing the colors of the patches in an input-DDCS such as scanner RGB space.

The device-independent and the device-dependent representations generated along paths 61 and 12, respectively, provide selected points in the two color spaces that define a forward function $f_I$ representing the way in which input device 10 converts real-world colors into a device-dependent representation. In response to these signals, calibration device 65 derives input-device map 21 which is an inverse function $f_I^{-1}$ from the DDCS to the DICS. For example, if measure device 60 generates values in CIE XYZ space and input device 10 generates signals in some RGB space, then the forward function corresponding to input device 10 may be denoted as $f_I$: XYZ→RGB and the inverse function corresponding to input-device map 21 may be denoted as $f_I^{-1}$: RGB→XYZ.

Figure 4A:
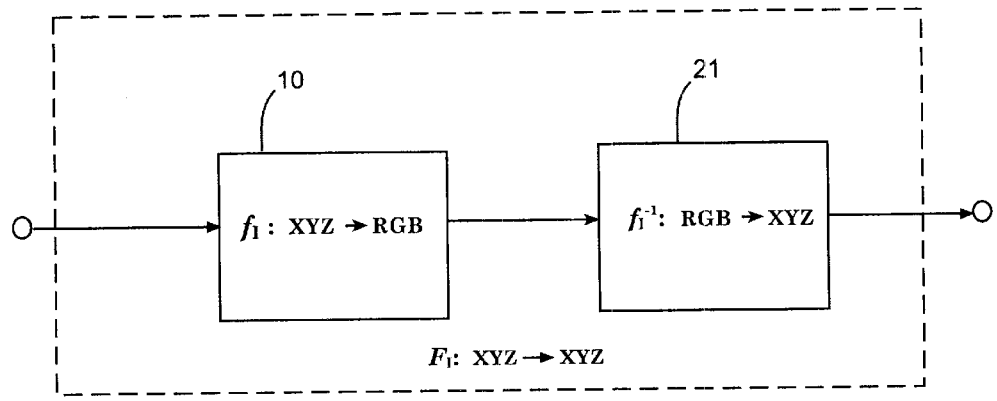
FIGS. 4A, 4B and 4C are block diagrams showing the end-to-end effects of input or output devices and the system components that implement device transformations.

The way in which these two components work together is illustrated in FIG. 4A. Input device 10 effects a transformation $f_I$ on values representing real-world colors to obtain values in some input-DDCS. It is often convenient to represent real-world colors in some DICS such as CIE XYZ space. The transformation may then be expressed as a mapping from CIE XYZ space to some input-DDCS such as an RGB space as described above. Input-device map 21 effects a transformation $f_I^{-1}$ on the values in the input-DDCS to obtain mapped values in some DICS such as CIE XYZ space. The end-to-end effects of these two components is to effect a transformation from one DICS to another DICS. According to the example discussed above and illustrated in the figure, the transformation is, in principle, similar to the identify matrix that maps from CIE XYZ space to CIE XYZ space, which may be denoted as $F_I$: XYZ→XYZ. In practice, however, arithmetic round off errors and interpolation errors introduce noise into the process.

FIG. 3B illustrates how an output device map, identified generally by the reference numeral 23, is derived. Output-device map 23 may be derived by using corresponding output device 30 to generate a corresponding image 35 and determining the color characteristics of that image 35. For example, image 35 may be one or more sheets of paper with patches that are analyzed by measure device 62 such as a spectral photometer or calorimeter. According to the technique shown in the figure, measure device 62 scans image 35 and generates signals along path 63 representing the colors of the patches in some DICS such as CIE XYZ or CIE L*a*b* space. Output device 30 or some component controlling output device 30 generates signals along path 33 representing the patches in some output-DDCS such as printer CMYK space.

The device-independent and the device-dependent representations generated along paths 63 and 33, respectively, provide selected points in the two color spaces that define a forward function $f_O$ representing the way in which output device 30 converts the device-dependent representation into real-world colors. In response to these signals, calibration device 67 derives output-device map 23 which is an inverse function $f_O^{-1}$ from the DICS to the DDCS. For example, if measure device 62 generates values in CIE L*a*b* space and output device 30 generates the image in response to signals in some CMYK space, then the forward function corresponding to output device 30 may be denoted as $f_O$: CMYK→L*a*b* and the inverse function corresponding to output-device map 23 may be denoted as $f_O^{-1}$: L*a*b*→CMYK.

Figure 4B:
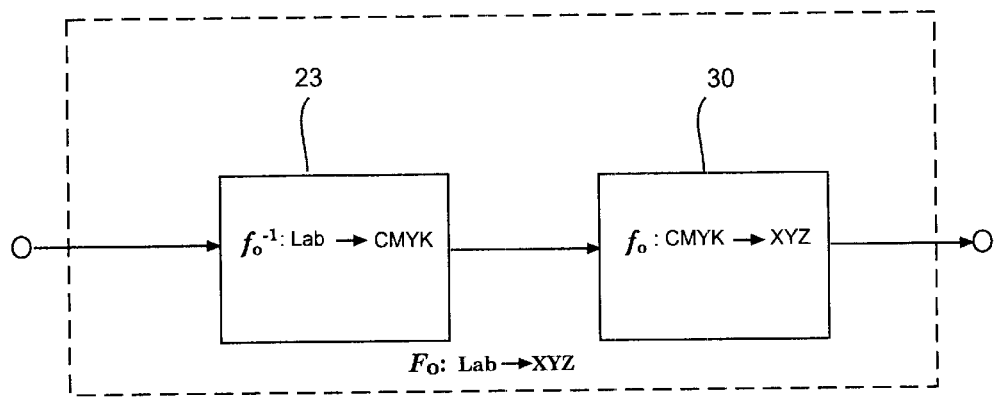

The way in which these two components work together is illustrated in FIG. 4B. Output-device map 23 effects a transformation $f_O^{-1}$ on values representing colors in some DICS to obtain values in some output-DDCS. Output device 30 effects a transformation $f_O$ on the values in the output-DDCS to obtain a replica image with real-world colors. If the real-world colors are expressed in some DICS such as CIE XYZ space, the transformation may then be expressed as a mapping from the output-DDCS to CIE XYZ as described above. The end-to-end effects of these two components is to effect a transformation from one DICS to another DICS. According to the example discussed above and illustrated in the figure, the transformation maps from CIE L*a*b* space to CIE XYZ space, which may be denoted as $F_O$: L*a*b*→XYZ.

Figure 5A:
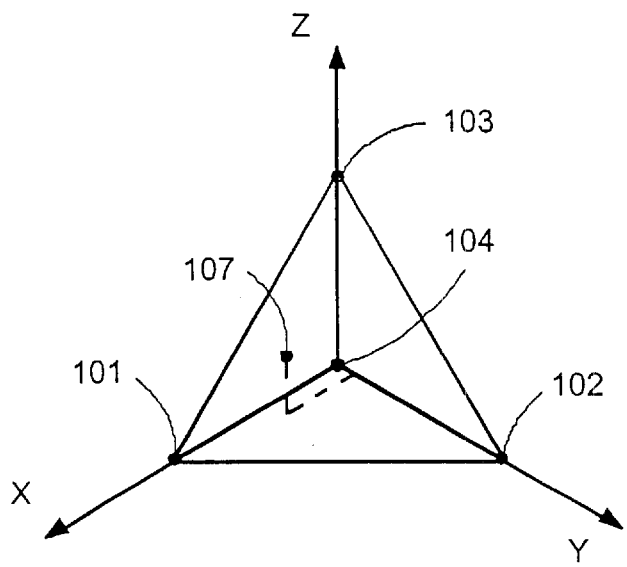
FIGS. 5A and 5B are schematic representations of points and regions in color spaces, particularly corresponding points and regions in CIE XYZ space and CIE L*a*b* space.
Figure 5B:
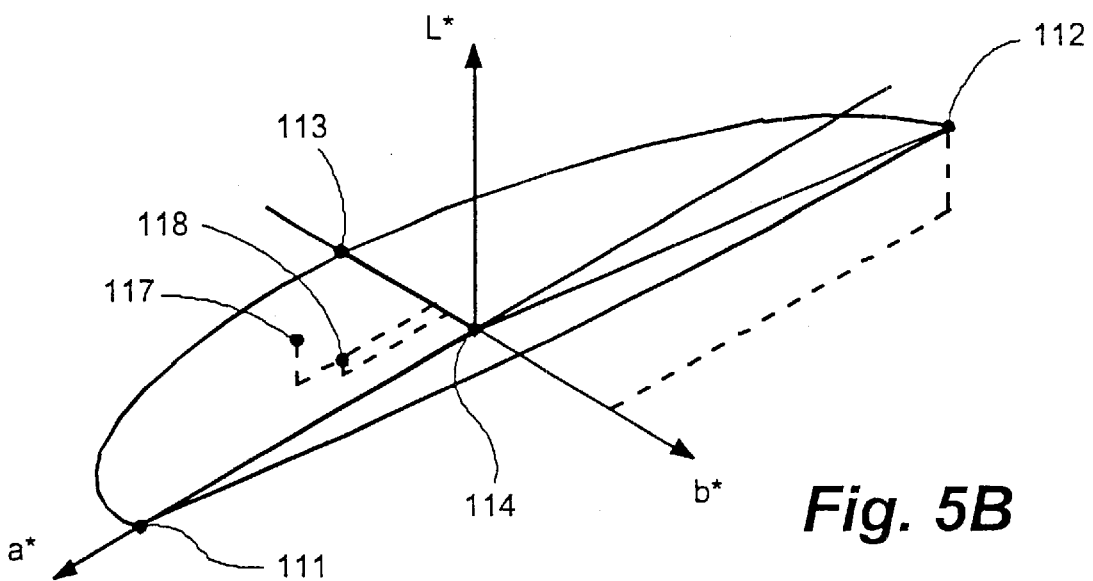

FIGS. 5A and B are schematic representations of points and regions in two color spaces. These figures illustrate corresponding points and regions in CIE XYZ space and CIE L*a*b* space and show a mapping relationship between arbitrary color spaces. As shown in the figures, points 101–104 in one color space correspond to points 111–114, respectively, in another color space. The points along the four straight-line segments connecting these references points in the color space of FIG. 5A space correspond to points along the curved and straight-line segments connecting the referenced points in the color space of FIG. 5B.

As these figures show, the correspondence is often non-linear. Because the transformation between color spaces usually cannot be expressed in a closed or analytical form, these transformations are often implemented by a look-up table, from which values of intermediate points may be obtained by interpolation.

Network systems incorporating scanners and printers typically use two DICS. Scanner signals are mapped into CIE XYZ space and printer signals are mapped from CIE L*a*b* space. It is, therefore, necessary to provide a map or transformation from CIE XYZ to CIE L*a*b* space. This transformation may be denoted $f_T$: XYZ→L*a*b*. As mentioned above, this transformation is illustrated in FIGS. 5A and 5B. In this case, controlling device 20 converts signals received from path 12 into signals generated along path 31 according to a transformation $f_Q$ that is equivalent to a cascaded application of the transformations discussed above, denoted here as $f_Q = f_I^{-1} \cdot f_T \cdot f_O^{-1}$, or $f_Q$: RGB→CMYK=$f_I^{-1}$:RGB→XYZ·$f_T$: XYZ→L*a*b*·$f_O^{-1}$: L*a*b*→CMYK.

Figure 4C:
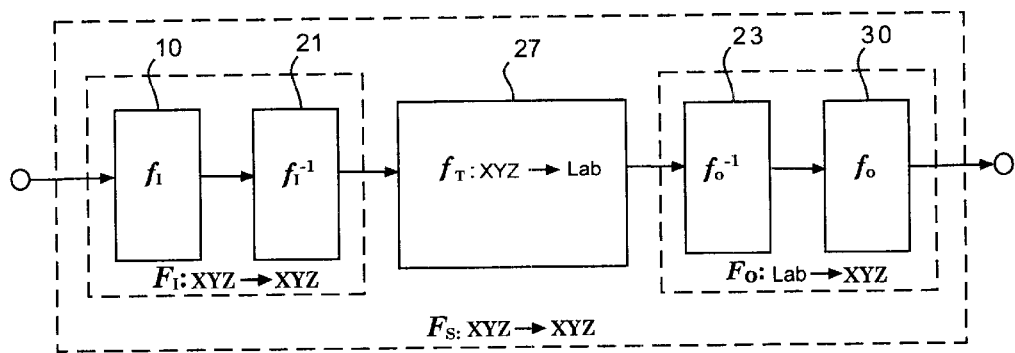

The effect of this transformation in conjunction with the other transformations is illustrated in FIG. 4C. As explained above, input device 10 and input-device map 21 effect a transformation from one DICS to another DICS such as from CIE XYZ space to CIE XYZ space, denoted as $F_I$: XYZ→XYZ. Output-device map 23 and output device 30 effect a transformation from one DICS to another DICS such as from CIE L*a*b* space to CIE XYZ space, denoted as $F_O$: L*a*b*→XYZ. By effecting a transformation from CIE XYZ space to CIE L*a*b* space, the $f_T$ transformation, shown in processing block 27, provides the link required to couple the $F_I$ and the $F_O$ transformations together.

The end-to-end effect of these coupled transformations represents the overall operation of the color image reproduction system. According to the example discussed above and illustrated in the figure, this end-to-end effect is a mapping $F_S$ from CIE XYZ space to CIE XYZ space which is, as mentioned above, equivalent in principle to an identity matrix. In absence of arithmetic round off errors and accuracy errors in the component transformations, the color image reproduction system is a transparent system that is able to reproduce an original image perfectly.

Unfortunately, even if the transformations could be implemented perfectly, reproduction errors still occur because practical input and output devices have limited gamuts that are generally not coextensive. As a result, the perceived accuracy of the replica depends on the ability of the system to substitute an in-gamut color that is indistinguishable from each out-of-gamut color. This process is sometimes referred to as gamut mapping.

A gamut mapping strategy that may be employed in connection present invention is disclosed in U.S. patent application Ser. No. 09/050,867 entitled "Self-Calibration for Color Image Reproduction System" and filed Mar. 30, 1998, the disclosure of which is incorporated by reference herein.

Even with the color transformations and gamut mapping, a given printer 30 will still exhibit certain color dependency properties that may be unique to it. As a result, the colors produced by different printers, even different printers of the same type and model, in response to the same input signals may differ. This difference is due, at least in part, to distortion of the signals which may occur as a result of the nonlinear response characteristics of circuit components which make up the devices and the manner in which a particular color within a printer color gamut is selected in response to the input signal. Thus, a given input signal representing a particular color provided to two different printers typically results in the printers producing two different colors even when the input signal represents a color included in the color gamuts of both printers. This results in variations in output images generated by different printers in response to the same input image. These variations may be quite noticeable among different printers of the same type (i.e., different ink-jet printers or different laser printers) and exist even among printers of the same model.

The present invention provides a technique to minimize or eliminate variations in output images 32A, 32B and 32C generated by the different output devices 30A, 30B and 30C of the same type in response to the same input signal 12. As previously noted, in the preferred embodiment, input device 10 is a scanner and output devices 30A, 30B and 30C are color printers of the same type and more preferably of the same model as well. One of the printers, say, printer 30A, is a reference printer, and the other printers, printers 30B and 30C in this case, are non-reference printers.

In accordance with the invention, the color dependency properties of a given printer 30 are characterized by four one-dimensional (1-D) characteristic functions, one for each of the printer colors (i.e., C, Y, M and K), which determine how a particular color is produced by that printer in response to its printer input signal 31. Collectively, the characteristic functions for a given printer 30 define the relationship between its input image signal 31 and its corresponding output image 32.

These 1-D characteristic functions are determined and used to further determine a set of four 1-D transfer functions for each non-reference printer 30B and 30C in the network system. These sets of 1-D transfer functions are then applied to each of the C, M, Y and K signals, which collectively make up the input image signal 31, of non-reference printers 30B and 30C to enable them to generate output images 32B and 32C which are very similar to the output image 32A generated by the reference printer 30A. This calibration technique effectively minimizes or eliminates variations in output images 32A, 32B and 32C generated by the different printers 30A, 30B and 30C in response to the same input signal 12.

Figure 6:
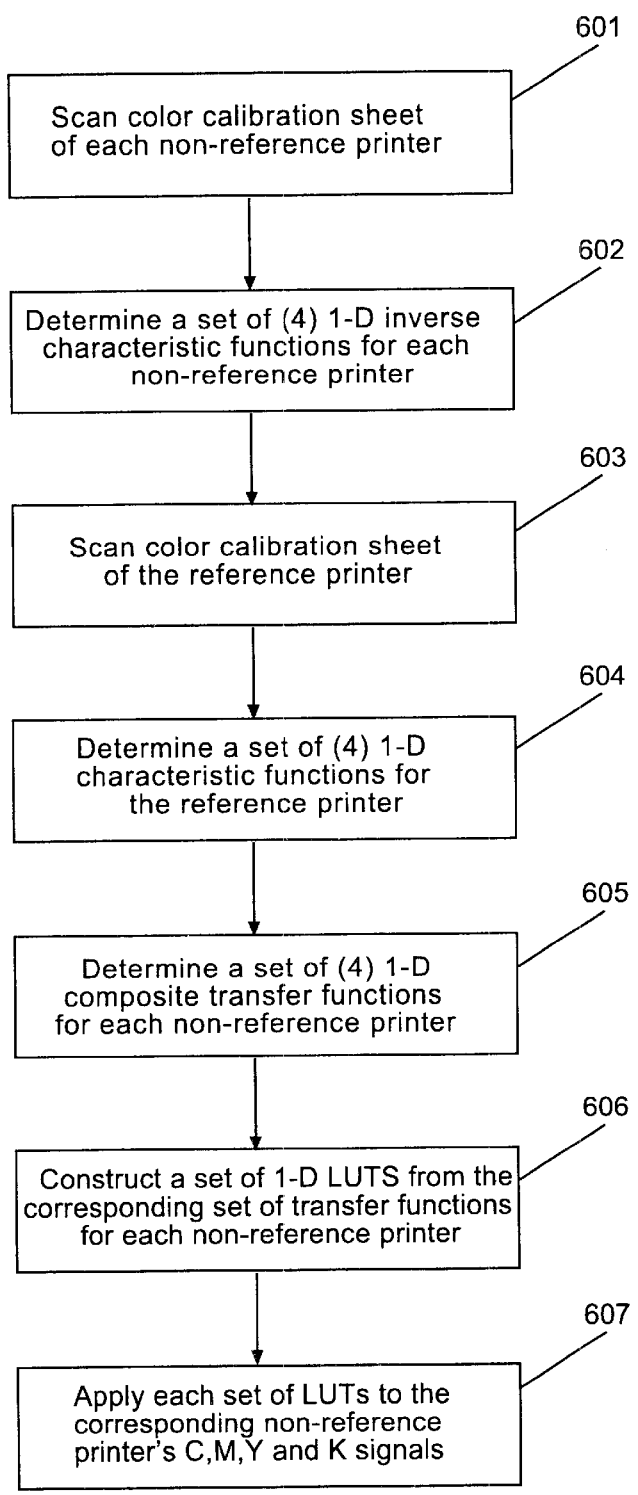
FIG. 6 is a flow diagram illustrating the steps of calibrating non-reference output devices to a reference output device in accordance with embodiments of the invention.

The characteristic functions for each of the colors of the reference printer 30A and the inverse characteristic functions for each of the primary colors of the non-reference printers 30B and 30C are determined using primary color calibration sheets generated by each printer. Referring to the flow diagram of FIG. 6, in step 601 the color calibration sheet of each non-reference printer 30B and 30C is scanned to generate corresponding scanner RGB data using the following color space transformation formula: C→R, M→G, Y→B and K→⅓(R+G+B). This color space transformation yields four 1-D characteristic functions, one describing the behavior of each primary color of each non-reference printer 30B and 30C, and their inverses (step 602). The four 1-D characteristic functions for printer 30B may be designated as $C_B$, $M_B$, $Y_B$ and $K_B$ and their inverses as $C_B^{-1}$, $M_B^{-1}$, $Y_B^{-1}$ and $K_B^{-1}$. Similarly, the four 1-D characteristic functions for printer 30C may be designated as $C_C$, $M_C$, $Y_C$ and $K_C$ and their inverses as $C_C^{-1}$, $M_C^{-1}$, $Y_C^{-1}$ and $K_C^{-1}$.

In the same manner, the color calibration sheet of the reference printer 30A is then scanned in step 603 to produce four 1-D characteristic functions for that printer: $C_A$, $M_A$, $Y_A$ and $K_A$ (step 604).

The color space transformation analysis used to determine the characteristic and inverse characteristic functions for the various printers 30A, 30B and 30C in the network system may be performed by constructing four 1-D LUTs and employing an interpolation technique. A variety of interpolation techniques are available including trilinear, prism, pyramid and tetrahedral.

Knowing the characteristic functions for each of the primary colors of the reference printer 30A and the inverse characteristic functions for each of the primary colors of each non-reference printer 30B and 30C, in step 605 a set of four 1-D composite transfer functions are determined for each non-reference printer 30B and 30C as follows:

| Printer 30B | Printer 30C |
| --- | --- |
| $f_{CB} = C_A \cdot C_B^{-1}$ | $f_{CC} = C_A \cdot C_C^{-1}$ |
| $f_{MB} = M_A \cdot M_B^{-1}$ | $f_{MC} = M_A \cdot M_C^{-1}$ |
| $f_{YB} = Y_A \cdot Y_B^{-1}$ | $f_{YC} = Y_A \cdot Y_C^{-1}$ |
| $f_{KB} = K_A \cdot K_B^{-1}$ | $f_{KC} = K_A \cdot K_C^{-1}$ |

From each set of transfer functions a set of corresponding 1-D LUTs are constructed in step 606. In step 607, these 1-D LUTs, also identified as $f_{CB}$, $f_{MB}$, $f_{YB}$ and $f_{KB}$, are respectively applied to the C, M, Y and K signals 31B of non-reference printer 30B so that its output signal 32B is the same as, or very similar to, the CMYK output signal 32A generated by the reference printer 30A. Similarly, $f_{CC}$, $f_{MC}$, $f_{YC}$ and $f_{KC}$ are applied to the C, M, Y and K signals, respectively, of non-reference printer 30C so that its output signal 32C is the same as, or very similar to, the output signal 32A generated by the reference printer 30A.

Using this procedure, additional non-reference printers in a network copier/printer system may be calibrated to the reference printer 30A to standardize the outputs produced by these additional non-reference printers in response to the same RGB signal 12.

Figure 7:
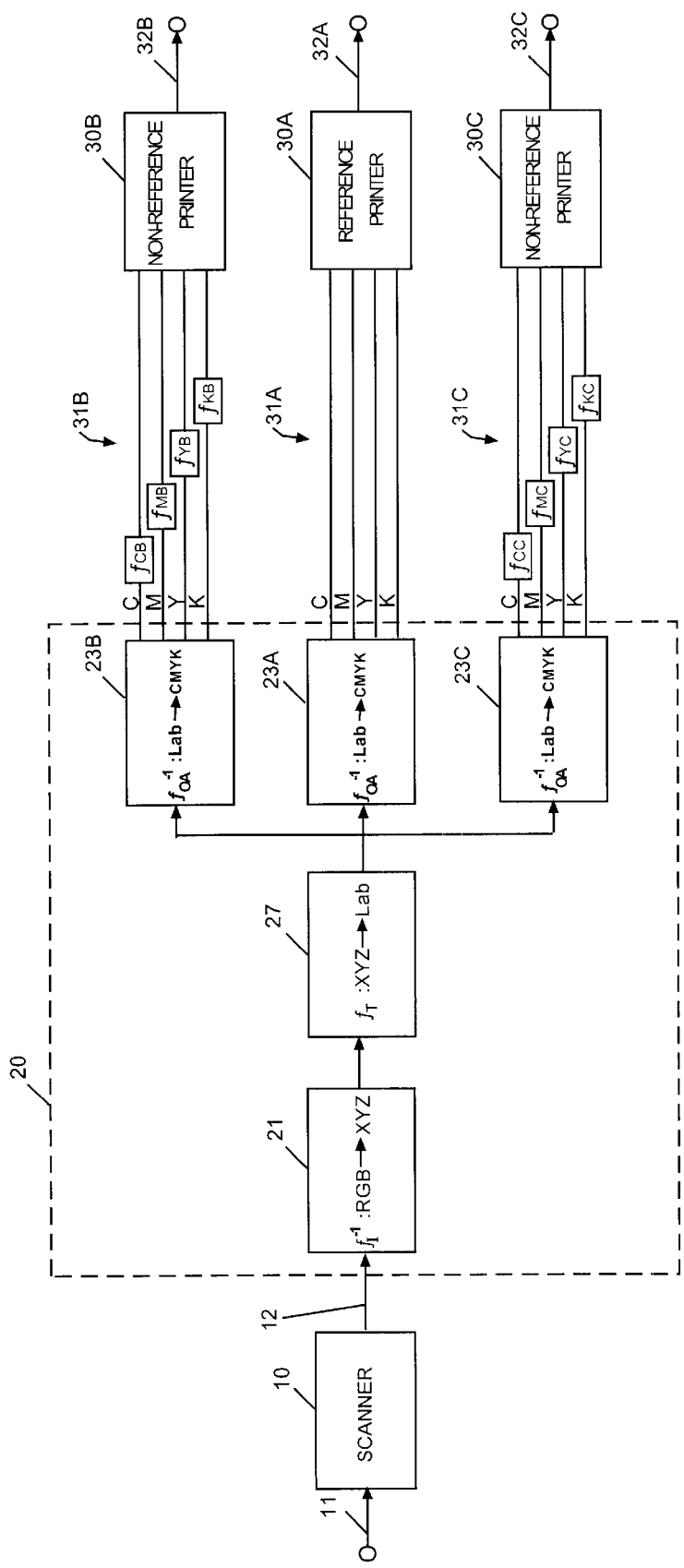
FIG. 7 is a block diagram illustrating major components and the overall operation of a network color image reproduction system in accordance with embodiments of the present invention.

The overall operation of a network copier or printing system in accordance with the invention is illustrated in FIG. 7. Scanner 10 receives optical signals 11 representing an original image and generates corresponding RGB signals 12. Controlling device 20 receives this RGB representation 12 and, in response, transforms the RGB signals 12 into corresponding C, M, Y and K signals 31A, 31B and 31C for each of the printers 30A, 30B and 30C. In so doing, controlling device 20 implements inverse function $f_I^{-1}$ corresponding to input device map 21, a transformation $f_T$ from CIE XYZ to CIE L*a*b* space, and an inverse function corresponding to output device maps 23A, 23B and 23C. In the network copier/printer system of the present invention, the output device maps 23B and 23C for non-reference printers 30B and 30C respectively are constructed based on the reference printer 30. Therefore, the inverse functions corresponding to the output device maps 23A, 23B and 23C will be the same. Each of these inverse functions is designated $f_{OA}^{-1}$. Thus, controlling device 20 implements a cascaded function $f_{QA}$ for each printer 30A, 30B and 30C respectively, where $f_{QA}=f_I^{-1} \cdot f_T \cdot f_{OA}^{-1}$. Following this transformation, the individual C, M, Y and K signals sent to non-reference printers 30B and 30C are adjusted by applying the corresponding 1-D transfer functions to those signals as follows: $f_{CB}$, $f_{MB}$, $f_{YB}$ and $f_{KB}$ are respectively applied to the C, M, Y and K signals of printer 30B and $f_{CC}$, $f_{MC}$, $f_{YC}$ and $f_{KC}$ are respectively applied to the C, M, Y and K signals of printer 30C. The 1-D LUTs may be stored in the corresponding non-reference printers 30B and 30C themselves, or, alternatively, in controlling device 20.

By providing such a 1-D LUT for each color signal of each non-reference printer in a network copier/printing system, as disclosed herein, the different printers in the system are able to produce, in response to the same input image, output images having little or no variation therebetween. In addition, the set of 1-D LUTs for each non-reference printer require only a small amount of memory overhead to implement.

The calibration technique of the present invention may be implemented using hardware, software, or combination thereof With that in mind, it is to be understood that the block and flow diagrams used to illustrate the technique of the present invention show the performance of certain specified functions and relationships thereof. The boundaries of these functional blocks have been arbitrarily defined herein for the convenience of description. Alternate boundaries may be defined so long as the specified functions and relationships thereof are appropriately formed. That is, the disclosure herein provides the functional information one skilled in the art would require to fabricate circuits or to write software code to perform the processing required. Each of the functions depicted in the block diagrams may be implemented, for example, by software instructions, a functionally equivalent circuit such as a digital signal processor circuit, an application specific integrated circuit (ASIC) or combination thereof.

While the invention has been described in conjunction with specific embodiments, it will be evident to those skilled in the art in light of the foregoing description that many further alternatives, modifications and variations are possible. The invention described and illustrated herein is intended to embrace all such alternatives, modifications, applications and variations as may fall within the spirit and scope of the appended claims.

What is claimed is:

1. A method for calibrating at least one non-reference imaging device to a reference imaging device, comprising the steps of:
   determining a set of 1-D characteristic functions for each non-reference imaging device, each set relating a plurality of primary colors of that non-reference imaging device with a plurality of color elements of an input device;
   determining a set of 1-D characteristic functions for the reference imaging device relating a plurality of primary colors of the reference imaging device with a plurality of color elements of the input device;
   determining a set of 1-D transfer functions in the form of a set of 1-D look-up tables for each non-reference imaging device based on the determined set of 1-D characteristic functions for the reference imaging device and the determined set of 1-D characteristic functions for that non-reference imaging device; and
   applying each set of 1-D look-up tables to the corresponding non-reference imaging device to calibrate that non-reference imaging device to the reference imaging device.

2. The method of claim 1, wherein the reference and each non-reference imaging device is a printer and the input device is a scanner.

3. The method of claim 2, wherein the plurality of primary colors of each non-reference and reference printer include C, M, Y and K and the plurality of color elements of the scanner include R, G and B.

4. The method of claim 3, wherein the set of 1-D characteristic functions for each non-reference printer is determined by scanning a color calibration sheet of the corresponding non-reference printer to generate a relationship between the scanner RGB data and the CMYK data of the corresponding non-reference printer using color space transformation analysis.

5. The method of claim 4, wherein the set of 1-D characteristic functions for the reference printer is determined by scanning a color calibration sheet of the reference printer to generate to generate a relationship between the scanner RGB data and the CMYK data of the reference printer using color space transformation analysis.

6. The method of claim 1, wherein each of the 1-D characteristic functions for each non-reference imaging device is an inverse characteristic function.

7. An network imaging system comprising:
   an input device for generating an input device representation of an image;
   a reference imaging device capable of producing an output image in response to an input image; and
   a plurality of non-reference imaging devices each capable of producing an output image in response to the input image, each non-reference imaging device having a set of 1-D transfer functions in the form of look-up tables, wherein each 1-D transfer function in a given set is a composite function of a first type of 1-D characteristic function which relates a primary color of the reference imaging device with at least one color element of the input device and a second type of 1-D characteristic function which relates a primary color of that non-reference imaging device with at least one color element of the input device.

8. The network imaging system of claim 7, wherein the reference and each non-reference imaging device is a printer and the input device is a scanner.

9. The network imaging system of claim 8, wherein each non-reference and reference printer has a plurality of primary colors including C, M, Y and K and the scanner has a plurality of color elements including R, G and B.

10. The network imaging system of claim 9, wherein each of the first type of 1-D characteristic functions is determined by scanning a color calibration sheet of the corresponding non-reference printer to generate a relationship between the scanner RGB data and the CMYK data of the corresponding non-reference printer using color space transformation analysis.

11. The network imaging system of claim 10, wherein each of the second type of 1-D characteristic functions is determined by scanning a color calibration sheet of the reference printer to generate a relationship between the scanner RGB data and the CMYK data of the reference printer using color space transformation analysis.

12. The network imaging system of claim 7, wherein each of the second type of 1-D characteristic functions is an inverse characteristic function.

13. A system having means for performing a method of calibrating at least one non-reference imaging device to a reference imaging device, said means for performing comprising at least one of a program of system executable instructions and hardware, said method comprising the steps of:
   determining a set of 1-D characteristic functions for each non-reference imaging device, each set relating a plurality of primary color of that non-reference imaging device with a plurality of color elements of an input device;
   determining a set of 1-D characteristic functions for the reference imaging device, each characteristic function relating a plurality of primary colors of the reference imaging device with the plurality of color elements of the input device;
   determining a set of 1-D transfer functions in the form of a set of 1-D look-up tables for each non-reference imaging device based on the determined set of 1-D characteristic functions for the reference imaging device and the determined set of 1-D characteristic functions for that non-reference imaging device; and
   applying each set of 1-D look-up tables to the corresponding non-reference imaging device to calibrate that non-reference imaging device to the reference imaging device.

14. The system of claim 13, wherein the reference and each non-reference imaging device is a printer and the input device is a scanner.

15. The system of claim 14, wherein the plurality of primary colors of each non-reference and reference printer include C, M, Y and K and the plurality of color elements of the scanner include R, G and B.

16. The system of claim 15, wherein the set of 1-D characteristic functions for each non-reference printer is determined by scanning a color calibration sheet of the corresponding non-reference printer to generate a relationship between the scanner RGB data and the CMYK data of the corresponding non-reference printer using color space transformation analysis.

17. The system of claim 16, wherein the set of 1-D characteristic functions for the reference printer is determined by scanning a color calibration sheet of the reference printer to generate to generate a relationship between the scanner RGB data and the CMYK data of the reference printer using color space transformation analysis.

18. The system of claim 13, wherein each of the 1-D characteristic functions for each non-reference imaging device is an inverse characteristic function.

19. A processor-readable medium having a program of instructions embodied therein for causing a processor to calibrate at least one non-reference imaging device to a reference imaging device, said program including instructions for:
   determining a set of 1-D characteristic functions for each non-reference imaging device, each set relating a plurality of primary colors of that non-reference imaging device with a plurality of color elements of an input device;
   determining a set of 1-D characteristic functions for the reference imaging device relating a plurality of primary colors of the reference imaging device with a plurality of color elements of the input device;
   determining a set of 1-D transfer functions in the form of a set of 1-D look-up tables for each non-reference imaging device based on the determined set of 1-D characteristic functions for the reference imaging device and the determined set of 1-D characteristic functions for that non-reference imaging device; and
   applying each set of 1-D look-up tables to the corresponding non-reference imaging device to calibrate that non-reference imaging device to the reference imaging device.

20. The processor-readable medium of claim 19, wherein the reference and each non-reference imaging device is a printer and the input device is a scanner.

21. The processor-readable medium of claim 20, wherein the plurality of primary colors of each non-reference and reference printer include C, M, Y and K and the plurality of color elements of the scanner include R, G and B.

22. The processor-readable medium of claim 21, wherein the set of 1-D characteristic functions for each non-reference printer is determined by scanning a color calibration sheet of the corresponding non-reference printer to generate a relationship between the scanner RGB data and the CMYK data of the corresponding non-reference printer using color space transformation analysis.

23. The processor-readable medium of claim 22, wherein the set of 1-D characteristic functions for the reference printer is determined by scanning a color calibration sheet of the reference printer to generate to generate a relationship between the scanner RGB data and the CMYK data of the reference printer using color space transformation analysis.

24. The processor-readable medium of claim 19, wherein each of the 1-D characteristic functions for each non-reference imaging device is an inverse characteristic function.

25. A carrier wave encoded to transmit a program of instructions executable by a machine to perform a method of calibrating at least one non-reference imaging device to a reference imaging device, said program including instructions for:
   determining a set of 1-D characteristic functions for each non-reference imaging device, each set relating a plurality of primary colors of that non-reference imaging device with a plurality of color elements of an input device;
   determining a set of 1-D characteristic functions for the reference imaging device relating a plurality of primary colors of the reference imaging device with a plurality of color elements of the input device;
   determining a set of 1-D transfer functions in the form of a set of 1-D look-up tables for each non-reference imaging device based on the determined set of 1-D characteristic functions for the reference imaging device and the determined set of 1D characteristic functions for that non-reference imaging device; and
   applying each set of 1-D look-up tables to the corresponding non-reference imaging device to calibrate that non-reference imaging device to the reference imaging device.

* * * * *